(12) United States Patent
Tamura et al.

(10) Patent No.: US 12,030,530 B2
(45) Date of Patent: Jul. 9, 2024

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Sho Tamura, Wako (JP); Takao Tamura, Wako (JP); Daichi Inoue, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 388 days.

(21) Appl. No.: 17/672,738

(22) Filed: Feb. 16, 2022

(65) Prior Publication Data

US 2022/0315058 A1 Oct. 6, 2022

(30) Foreign Application Priority Data

Mar. 31, 2021 (JP) .................................. 2021-062073

(51) Int. Cl.
*B60W 50/02* (2012.01)
*B60W 60/00* (2020.01)

(52) U.S. Cl.
CPC .... *B60W 60/0053* (2020.02); *B60W 50/0205* (2013.01); *B60W 2552/53* (2020.02);
(Continued)

(58) Field of Classification Search
CPC .......... B60W 60/0053; B60W 50/0205; B60W 2552/53; B60W 2554/4041;
(Continued)

(56) References Cited

U.S. PATENT DOCUMENTS

2021/0146962 A1 5/2021 Kaji et al.
2021/0380145 A1* 12/2021 Yoo ....................... B60W 40/08
(Continued)

FOREIGN PATENT DOCUMENTS

JP 2017-146724 8/2017
JP 2018-045500 3/2018
(Continued)

OTHER PUBLICATIONS

Japanese Office Action for Japanese Patent Application No. 2022-208587 mailed Oct. 31, 2023.
(Continued)

*Primary Examiner* — Peter D Nolan
*Assistant Examiner* — Ashley L Redhead, Jr.
(74) *Attorney, Agent, or Firm* — Amin, Turocy & Watson, LLP

(57) ABSTRACT

A vehicle control device recognizes surrounding circumstances of a vehicle, controls steering and acceleration/deceleration of the vehicle without depending on an operation of a driver of the vehicle, determines any one of a plurality of driving modes including a first driving mode and a second driving mode as a driving mode of the vehicle, changes the driving mode of the vehicle to a driving mode in which the task is heavier when a task associated with the determined driving mode is not executed by the driver, determines whether or not the map information includes an error and determines whether or not a road division line is included in the surrounding circumstances, and sets a longer traveling continuation distance in the second driving mode in a case where it is determined that the map information includes an error, the road division line is not included in the surrounding circumstances, and a preceding vehicle has been recognized.

15 Claims, 7 Drawing Sheets

(52) U.S. Cl.
CPC . *B60W 2554/4041* (2020.02); *B60W 2556/40* (2020.02); *B60W 2710/20* (2013.01); *B60W 2720/106* (2013.01)

(58) Field of Classification Search
CPC ......... B60W 2556/40; B60W 2710/20; B60W 2720/106; B60W 60/0057; B60W 2556/50; B60W 60/0051; B60W 60/0055; B60W 60/0054
See application file for complete search history.

(56) References Cited

U.S. PATENT DOCUMENTS

| | | | |
|---|---|---|---|
| 2021/0382560 A1* | 12/2021 | Barth | G06F 3/017 |
| 2022/0204027 A1 | 6/2022 | Hitakatsu et al. | |
| 2022/0266869 A1* | 8/2022 | Ito | B60W 60/0057 |
| 2022/0315043 A1 | 10/2022 | Tamura et al. | |
| 2022/0315058 A1* | 10/2022 | Tamura | B60W 60/0051 |
| 2023/0063930 A1* | 3/2023 | Ichida | G06V 20/597 |
| 2024/0010216 A1* | 1/2024 | Kume | B60W 60/0059 |

FOREIGN PATENT DOCUMENTS

| | | |
|---|---|---|
| JP | 2018-189900 | 11/2018 |
| JP | 2019-038396 | 3/2019 |
| JP | 2020-050086 | 4/2020 |
| JP | 2021-047609 | 3/2021 |
| JP | 2021-123262 | 8/2021 |
| JP | 2022-103505 | 7/2022 |
| JP | 2022-156557 | 10/2022 |
| WO | 2018/220826 | 12/2018 |

OTHER PUBLICATIONS

Japanese Notice of Allowance for Japanese Patent Application No. 2021-062073 mailed Nov. 29, 2022.

* cited by examiner

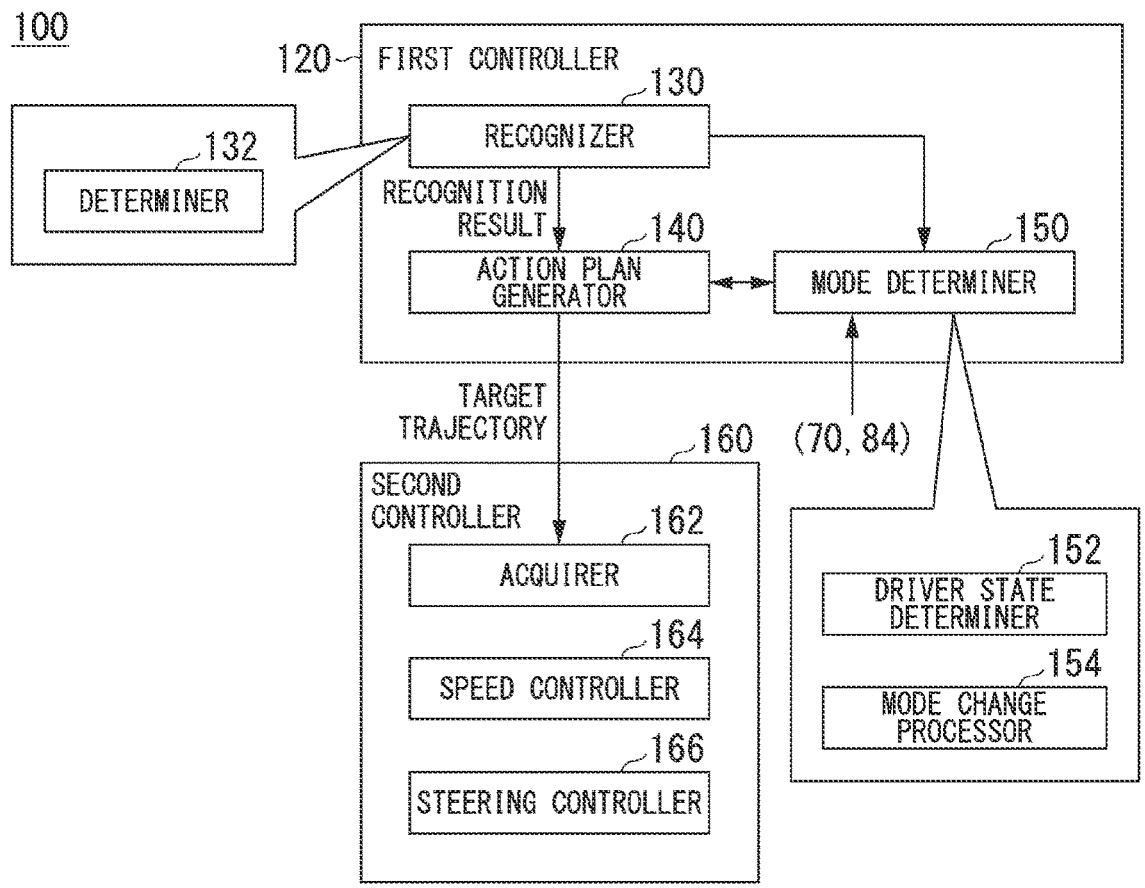

| DRIVING MODE | CONTROL STATE | TASK | |
|---|---|---|---|
| MODE A | AUTOMATED DRIVING | FRONT MONITORING: UNNECESSARY<br>STEERING GRIPPING: UNNECESSARY | ↑ TASK: LIGHT |
| MODE B | DRIVING SUPPORT | FRONT MONITORING: NECESSARY<br>STEERING GRIPPING: UNNECESSARY | |
| MODE C | DRIVING SUPPORT | FRONT MONITORING: NECESSARY<br>STEERING GRIPPING: NECESSARY | |
| MODE D | DRIVING SUPPORT | FRONT MONITORING: NECESSARY<br>AT LEAST CERTAIN DEGREE OF DRIVING OPERATION IS REQUIRED | |
| MODE E | MANUAL DRIVING | FRONT MONITORING: NECESSARY<br>BOTH STEERING AND ACCELERATION/DECELERATION REQUIRE DRIVING OPERATION | ↓ TASK: HEAVY |

FIG. 6

| LOST PATTERN OF CAMERA ROAD DIVISION LINE WHEN PRECEDING VEHICLE IS PRESENT<br><br>——— CAMERA ROAD DIVISION LINE<br>------- ACTUAL ROAD DIVISION LINE | (a) | (b) | (c) | (d) | (e) |
|---|---|---|---|---|---|
| LOST CAMERA ROAD DIVISION LINE | NO | ONE SIDE | ONE SIDE | ONE SIDE | BOTH SIDES |
| ERRONEOUS RECOGNITION OF CAMERA ROAD DIVISION LINE | NO | NO | YES | YES | — |
| POSITION OF CAMERA ROAD DIVISION LINE | BACK SIDE/FRONT SIDE OF PRECEDING VEHICLE | BACK SIDE/FRONT SIDE OF PRECEDING VEHICLE | FRONT SIDE OF PRECEDING VEHICLE | REAR SIDE OF PRECEDING VEHICLE | — |
| TRAVELING CONTINUATION DISTANCE IN MODE B | FIRST CONTINUATION DISTANCE | SECOND CONTINUATION DISTANCE | SECOND CONTINUATION DISTANCE | ZERO (MODE B IS TERMINATED) | ZERO (MODE B IS TERMINATED) |

FIG. 7

| LOST PATTERN OF CAMERA ROAD DIVISION LINE WHEN PRECEDING VEHICLE IS NOT PRESENT<br><br>—— CAMERA ROAD DIVISION LINE<br>---- ACTUAL ROAD DIVISION LINE | (f) | (g) |
|---|---|---|
| LOST CAMERA ROAD DIVISION LINE | NO | AT LEAST ONE SIDE |
| ERRONEOUS RECOGNITION OF CAMERA ROAD DIVISION LINE | NO | – |
| POSITION OF CAMERA ROAD DIVISION LINE | – | – |
| TRAVELING CONTINUATION DISTANCE IN MODE B | THIRD CONTINUATION DISTANCE | ZERO (MODE B IS TERMINATED) |

VEHICLE CONTROL DEVICE, VEHICLE CONTROL METHOD, AND STORAGE MEDIUM

CROSS-REFERENCE TO RELATED APPLICATION

The application is based on Japanese Patent Application No. 2021-062073 filed on Mar. 31, 2021, the content of which is incorporated herein by reference.

BACKGROUND

Field of the Invention

The present invention relates to a vehicle control device, a vehicle control method, and a storage medium.

Description of Related Art

Techniques for changing the mode of driving control of vehicles are known. For example, Japanese Unexamined Patent Application, First Publication No. 2020-050086 discloses a technique for changing driving control based on lane marks to driving control in another mode in a case where it is difficult to continuously recognize lane marks on a road.

SUMMARY

However, in the related art, in a case where map information stored in a vehicle and recognized outside information are different from each other, driving control may not be able to be changed flexibly.

The present invention is contrived in view of such circumstances, and one of objects thereof is to provide a vehicle control device, a vehicle control method, and a storage medium which are capable of flexibly changing driving control even when map information stored in a vehicle and recognized outside information are different from each other.

A vehicle control device, a vehicle control method, and a storage medium according to the present invention adopt the following configurations.

(1) A vehicle control device according to an aspect of the present invention includes a storage device that stores a program; and a hardware processor, in which the hardware processor executes the program stored in the storage device to recognize surrounding circumstances of a vehicle; control steering and acceleration/deceleration of the vehicle without depending on an operation of a driver of the vehicle based on the surrounding circumstances and map information; determine any one of a plurality of driving modes including a first driving mode and a second driving mode as a driving mode of the vehicle, and change the driving mode of the vehicle to a driving mode in which the task is heavier when a task associated with the determined driving mode is not executed by the driver, the second driving mode being a driving mode in which a task assigned to the driver is lighter than that of the first driving mode, some of the plurality of driving modes including at least the second driving mode being performed by controlling the steering and the acceleration/deceleration of the vehicle without depending on the operation of the driver of the vehicle; determine whether or not the map information includes an error and determine whether or not a road division line is included in the surrounding circumstances, based on the surrounding circumstances and the map information; and set a longer traveling continuation distance in the second driving mode in a case where it is determined during traveling of the vehicle in the second driving mode that the map information includes an error, the road division line is not included in the surrounding circumstances, and a preceding vehicle has been recognized within a first predetermined distance on a traveling direction side of the vehicle, compared to a case where a preceding vehicle has not been recognized.

(2) In the aspect of (1), the hardware processor compares the map information and the surrounding circumstances with each other, and in a case where the map information and the surrounding circumstances do not match each other, it is determined whether or not a road division line is included in the surrounding circumstances based on at least one of whether or not the road division lines on both sides of the vehicle have been recognized, a degree of parallelism between the road division lines on both sides, and a traveling trajectory of the preceding vehicle.

(3) In the aspect of (1), the hardware processor determines whether the road division lines on both sides of the vehicle are not included or whether only the road division line on one side of the vehicle is not included, in a case where it is determined that the road division line is not included in the surrounding circumstances.

(4) In the aspect of (3), the hardware processor determines whether or not erroneous recognition has occurred in the road division line on the other side of the vehicle in a case where it is determined that only the road division line on one side of the vehicle is not included in the surrounding circumstances, and determines whether the road division line on the other side of the vehicle has deviated to the outside or the inside with the traveling direction of the vehicle as a reference in a case where it is determined that erroneous recognition has occurred in the road division line on the other side of the vehicle.

(5) In the aspect of (4), the hardware processor determines whether the road division line on the other side of the vehicle has deviated to the outside or the inside with the traveling direction of the vehicle as a reference based on the degree of parallelism with respect to the traveling trajectory of the preceding vehicle in a case where it is determined that erroneous recognition has occurred in the road division line on the other side of the vehicle, and a preceding vehicle has been recognized within the first predetermined distance on the traveling direction side of the vehicle.

(6) In the aspect of (3), the hardware processor determines whether the road division line on the other side of the vehicle extends from a position of the vehicle to a side in front of the preceding vehicle in a case where it is determined that only the road division line on one side of the vehicle is not included in the surrounding circumstances, and a preceding vehicle has been recognized within the first predetermined distance on the traveling direction side of the vehicle.

(7) In the aspect of (1), the hardware processor sets a traveling continuation distance in the second driving mode to be a first continuation distance in a case where it is determined that the map information includes an error, it is determined that the road division lines on both sides are included in the surrounding circumstances, and a preceding vehicle has been recognized within the first predetermined distance on the traveling direction side of the vehicle.

(8) In the aspect of (3), the hardware processor sets a traveling continuation distance in the second driving mode to be a second continuation distance in a case where it is determined that the map information includes an error, it is determined that only the road division line on one side of the vehicle is not included in the surrounding circumstances, it is determined that erroneous recognition has not occurred in the road division line on the other side, and a preceding vehicle has been recognized within the first predetermined distance on the traveling direction side of the vehicle.

(9) In the aspect of (6), the hardware processor sets a traveling continuation distance in the second driving mode to be a second continuation distance in a case where it is determined that the map information includes an error, it is determined that only the road division line on one side of the vehicle is not included in the surrounding circumstances, it is determined that erroneous recognition has occurred in the road division line on the other side, it is determined that the road division line on the other side extends from the position of the vehicle to the side in front of the preceding vehicle, and a preceding vehicle has been recognized within the first predetermined distance on the traveling direction side of the vehicle.

(10) In the aspect of (6), the hardware processor changes the second driving mode to the first driving mode in a case where it is determined that the map information includes an error, it is determined that only the road division line on one side of the vehicle is not included in the surrounding circumstances, it is determined that erroneous recognition has occurred in the road division line on the other side, it is determined that the road division line on the other side does not extend from the position of the vehicle to the side in front of the preceding vehicle, and a preceding vehicle has been recognized within the first predetermined distance on the traveling direction side of the vehicle.

(11) In the aspect of (3), the hardware processor changes the second driving mode to the first driving mode in a case where it is determined that the map information includes an error, it is determined that the road division lines on both sides of the vehicle are not included in the surrounding circumstances, and a preceding vehicle has been recognized within the first predetermined distance on the traveling direction side of the vehicle.

(12) In the aspect of (1), the hardware processor sets a traveling continuation distance in the second driving mode to be a third continuation distance in a case where it is determined that the map information includes an error, it is determined that the road division lines on both sides are included in the surrounding circumstances, and a preceding vehicle has not been recognized within the first predetermined distance on the traveling direction side of the vehicle.

(13) In the aspect of (1), the hardware processor changes the second driving mode to the first driving mode in a case where it is determined that the map information includes an error, it is determined that the road division line is not included in the surrounding circumstances, and a preceding vehicle has not been recognized within the first predetermined distance on the traveling direction side of the vehicle.

(14) A vehicle control method to be executed by a computer according to another aspect of the present invention includes recognizing surrounding circumstances of a vehicle; controlling steering and acceleration/deceleration of the vehicle without depending on an operation of a driver of the vehicle based on the surrounding circumstances and map information; determining any one of a plurality of driving modes including a first driving mode and a second driving mode as a driving mode of the vehicle, and changing the driving mode of the vehicle to a driving mode in which the task is heavier when a task associated with the determined driving mode is not executed by the driver, the second driving mode being a driving mode in which a task assigned to the driver is lighter than that of the first driving mode, some of the plurality of driving modes including at least the second driving mode being performed by controlling the steering and the acceleration/deceleration of the vehicle without depending on the operation of the driver of the vehicle; determining whether or not the map information includes an error and determining whether or not erroneous recognition has occurred in a road division line included in the surrounding circumstances, based on the surrounding circumstances and the map information; and setting a longer traveling continuation distance in the second driving mode in a case where it is determined during traveling of the vehicle in the second driving mode that the map information includes an error, the road division line is not included in the surrounding circumstances, and a preceding vehicle has been recognized within a first predetermined distance on a traveling direction side of the vehicle, compared to a case where a preceding vehicle has not been recognized.

(15) A computer-readable non-transitory storage medium according to still another aspect of the present invention causes a computer to recognize surrounding circumstances of a vehicle; determine whether or not a road division line is included in the surrounding circumstances based on the surrounding circumstances and map information; control steering and acceleration/deceleration of the vehicle without depending on an operation of a driver of the vehicle based on the surrounding circumstances and map information; determine any one of a plurality of driving modes including a first driving mode and a second driving mode as a driving mode of the vehicle, and change the driving mode of the vehicle to a driving mode in which the task is heavier when a task associated with the determined driving mode is not executed by the driver, the second driving mode being a driving mode in which a task assigned to the driver is lighter than that of the first driving mode, some of the plurality of driving modes including at least the second driving mode being performed by controlling the steering and the acceleration/deceleration of the vehicle without depending on the operation of the driver of the vehicle; determine whether or not the map information includes an error and determine whether or not erroneous recognition has occurred in a road division line included in the surrounding circumstances, based on the surrounding circumstances and the map information, and set a longer traveling continuation distance in the second driving mode in a case where it is determined during traveling of the vehicle in the second driving mode that the map information includes an error, the road division line is not included in the surrounding circumstances, and a preceding vehicle has been recognized within a first predetermined distance on a traveling direction side of the vehicle, compared to a case where a preceding vehicle has not been recognized.

According to (1) to (15), it is possible to flexibly change driving control even when map information stored in a vehicle and recognized outside information are different from each other.

BRIEF DESCRIPTION OF THE DRAWINGS

FIG. 2 is a functional configuration diagram of a first controller and a second controller.

FIG. 3 is a diagram illustrating an example of a correspondence relationship between a driving mode, a control state of a host vehicle M, and a task.

FIG. 6 is a diagram illustrating a method in which an action plan generator sets a traveling continuation distance in a driving mode of a mode B in a case where a recognizer recognizes a preceding vehicle.

FIG. 7 is a diagram illustrating a method in which the action plan generator sets a traveling continuation distance in the driving mode of the mode B in a case where the recognizer does not recognize a preceding vehicle.

DESCRIPTION OF EMBODIMENTS

Hereinafter, embodiments of a vehicle control device, a vehicle control method, and a storage medium of the present invention will be described with reference to the accompanying drawings.

[Overall Configuration]

Figure 1:
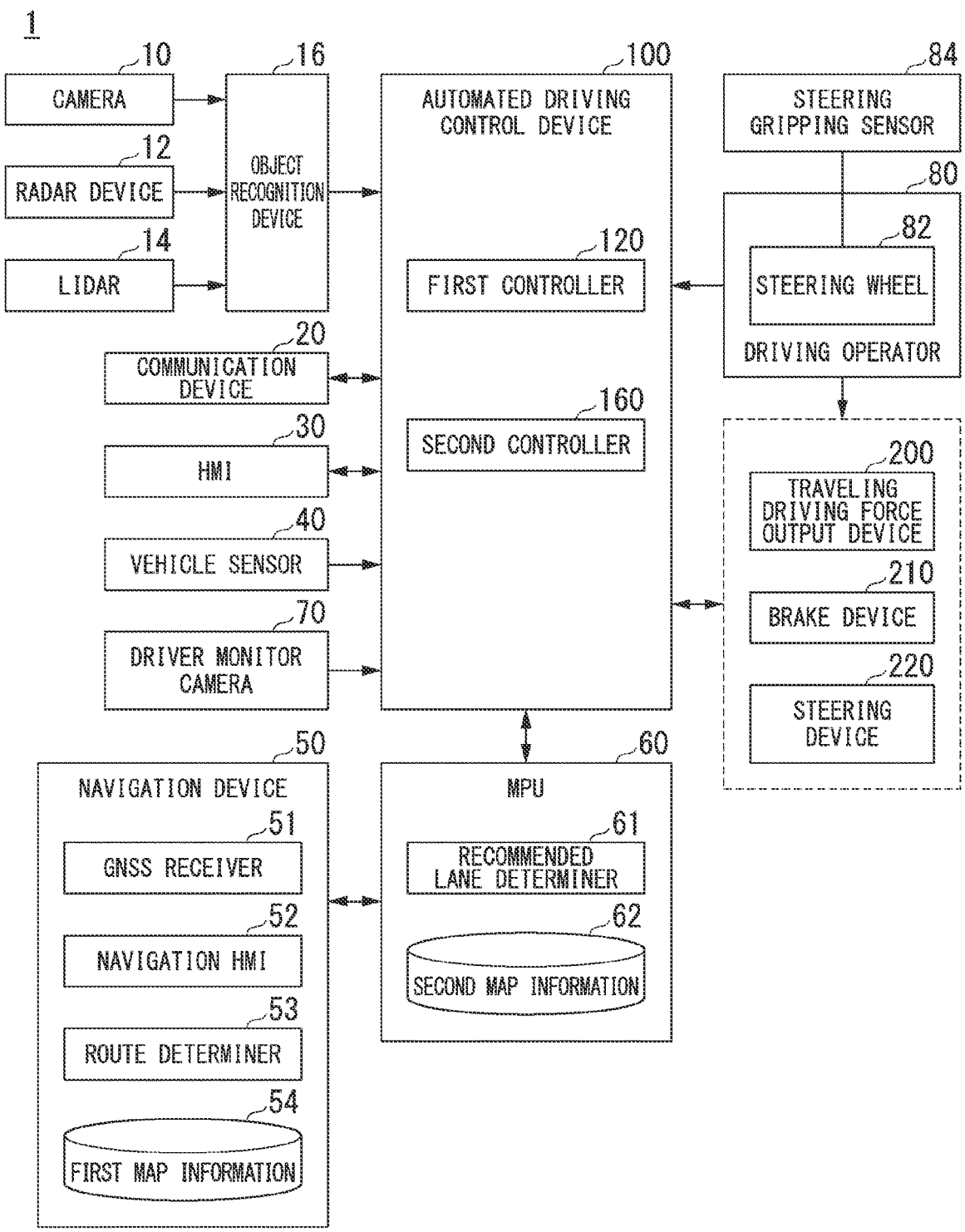
FIG. 1 is a configuration diagram of a vehicle system using a vehicle control device according to an embodiment.

FIG. 1 is a configuration diagram of a vehicle system 1 using a vehicle control device according to an embodiment. A vehicle equipped with the vehicle system 1 is a vehicle such as a two-wheeled vehicle, a three-wheeled vehicle, or a four-wheeled vehicle, and a driving source thereof is an internal-combustion engine such as a diesel engine or a gasoline engine, a motor, or a combination thereof. The motor is operated using power generated by a power generator connected to the internal-combustion engine, or power discharged by a secondary battery or a fuel cell.

The vehicle system 1 includes, for example, a camera 10, radars device 12, a Light Detection and Ranging (LIDAR) 14, an object recognition device 16, a communication device 20, a Human Machine Interface (HMI) 30, a vehicle sensor 40, a navigation device 50, a Map Positioning Unit (MPU) 60, a driver monitor camera 70, a driving operator 80, an automated driving control device 100, a traveling driving force output device 200, a brake device 210, and a steering device 220. These devices and apparatuses are connected to each other through a multiple communication line such as a Controller Area Network (CAN) communication line, a serial communication line, a wireless communication network, or the like. Meanwhile, the configuration illustrated in FIG. 1 is just an example, and a portion of the configuration may be omitted, or other configurations may be added.

The camera 10 is a digital camera using a solid-state image sensing device such as a Charge Coupled Device (CCD) or a Complementary Metal Oxide Semiconductor (CMOS). The camera 10 is attached to any location of the vehicle (hereinafter, a host vehicle M) on which the vehicle system 1 is mounted. In a case where a front side is imaged, the camera 10 is attached to an upper portion of a front windshield, a rear surface of a rearview mirror, or the like. For example, the camera 10 may repeatedly image the surroundings of the host vehicle M at regular intervals. The camera 10 may be a stereo camera.

The radar device 12 radiates radio waves such as millimeter waves to the surroundings of the host vehicle M, and also detects radio waves (reflected waves) reflected by an object to detect at least the position (distance and direction) of the object. The radar device 12 is attached to any location of the host vehicle M. The radar device 12 may detect the position and speed of the object by a Frequency Modulated Continuous Wave (FM-CW) method.

The LIDAR 14 irradiates the surroundings of the host vehicle M with light (or electromagnetic waves having a wavelength close to light) to measure scattered light. The LIDAR 14 detects a distance to a target on the basis of a period of time from light emission to light reception. The emitted light is, for example, a pulsed laser beam. The LIDAR 14 is attached to any location of the host vehicle M.

The object recognition device 16 performs sensor fusion processing on detection results obtained by some or all of the camera 10, the radar device 12, and the LIDAR 14 to recognize the position, type, speed, and the like of the object. The object recognition device 16 outputs a recognition result to the automated driving control device 100. The object recognition device 16 may output detection results of the camera 10, the radar device 12, and the LIDAR 14 to the automated driving control device 100 as they are. The object recognition device 16 may be omitted from the vehicle system 1.

The communication device 20 communicates with other vehicles that are present in the vicinity of the host vehicle M using, for example, a cellular network, a Wi-Fi network, Bluetooth (registered trademark), Dedicated Short Range Communication (DSRC), or the like or communicates with various server devices through a wireless base station.

The HMI 30 presents various information to an occupant of the host vehicle M and receives the occupant's input operation. The HMI 30 includes various display devices, a speaker, a buzzer, a touch panel, a switch, a key, and the like.

The vehicle sensor 40 includes a vehicle speed sensor that detects the speed of the host vehicle M, an acceleration sensor that detects an acceleration, a Yaw rate sensor that detects the angular velocity around a vertical axis, a direction sensor that detects the direction of the host vehicle M, and the like.

The navigation device 50 includes, for example, a Global Navigation Satellite System (GNSS) receiver 51, a navigation HMI 52, and a route determiner 53. The navigation device 50 stores first map information 54 in a storage device such as a Hard Disk Drive (HDD) or a flash memory. The GNSS receiver 51 specifies the position of the host vehicle M on the basis of a signal received from a GNSS satellite. The position of the host vehicle M may be specified or supplemented by an Inertial Navigation System (INS) using an output of the vehicle sensor 40. The navigation HMI 52 includes a display device, a speaker, a touch panel, a key, and the like. The navigation HMI 52 may be partially or wholly shared with respect to the HMI 30 described above. For example, the route determiner 53 determines a route (hereinafter, a route on map) from the position (or any input position) of the host vehicle M which is specified by the GNSS receiver 51 to a destination input by the occupant using the navigation HMI 52 with reference to the first map information 54. The first map information 54 is, for example, information in which a road shape is expressed by a link indicating a road and a node connected by the link. The first map information 54 may include road curvature, Point Of Interest (POI) information, and the like.

The route on map is output to the MPU 60. The navigation device 50 may perform route guidance using the navigation HMI 52 on the basis of the route on map. The navigation device 50 may be realized using a function of a terminal device such as a smartphone or a tablet terminal which is owned by an occupant. The navigation device 50 may transmit the present position and a destination to a navigation server through the communication device 20 and may acquire a route equal to the route on map from the navigation server.

The MPU 60 includes, for example, a recommended lane determiner 61 and stores second map information 62 in a storage device such as an HDD or a flash memory. The recommended lane determiner 61 divides the route on map provided from the navigation device 50 into a plurality of blocks (divides the route on map, for example, for each 100 [m] in a vehicle traveling direction), and determines a recommended lane for each block with reference to the second map information 62. The recommended lane determiner 61 determines in which lane the vehicle is to travel from the left.

In a case where a branch point exists on the route on map, the recommended lane determiner 61 determines a recommended lane so that the host vehicle M can travel along a reasonable route to proceed to a branch destination.

The second map information 62 is map information which is more accurate than the first map information 54. The second map information 62 includes, for example, information on the center of a lane, information on a boundary of a lane, and the like. In addition, the second map information 62 may include road information, traffic regulation information, address information (address/zip code), facility information, phone number information, information on prohibited sections in which a mode A or a mode B, which will be described later, is prohibited, and the like. The second map information 62 may be updated at any time by the communication device 20 communicating with other devices.

The driver monitor camera 70 is a digital camera using a solid-state image sensing device such as a CCD or a CMOS. The driver monitor camera 70 is attached to any location on the host vehicle M at a position and direction in which the head of an occupant (hereinafter, a driver) seated in a driver's seat of the host vehicle M can be imaged from the front (in a direction in which the face is imaged). For example, the driver monitor camera 70 is attached to an upper portion of a display device provided in a central portion of an installment panel of the host vehicle M.

The driving operator 80 includes, for example, an accelerator pedal, a brake pedal, a shift lever, and other operators, in addition to a steering wheel 82. A sensor that detects the amount of operation or whether or not an operation has been performed is attached to the driving operator 80, and the detection results thereof are output to the automated driving control device 100, or some or all of the traveling driving force output device 200, the brake device 210, and the steering device 220. The steering wheel 82 is an example of an "operator for receiving a steering operation". The operator does not necessarily need to have an annular shape, and may be in the form of a deformed steering wheel, a joystick, a button, or the like. A steering gripping sensor 84 is attached to the steering wheel 82. The steering gripping sensor 84 is realized by a capacitance sensor or the like, and outputs a signal by which it is possible to detect whether or not the driver is gripping the steering wheel 82 (meaning that the driver is in contact with the steering wheel 82 in a state where a force is applied thereto) to the automated driving control device 100.

The automated driving control device 100 includes, for example, a first controller 120 and a second controller 160. Each of the first controller 120 and the second controller 160 is realized by a hardware processor such as a Central Processing Unit (CPU) executing programs (software). In addition, some or all of these components may be realized by hardware (a circuit unit; including circuitry) such as a Large Scale Integration (LSI), an Application Specific Integrated Circuit (ASIC), a Field-Programmable Gate Array (FPGA), and a Graphics Processing Unit (GPU), or may be realized by cooperation of software and hardware. The programs may be stored in advance in a storage device (a storage device including a non-transitory storage medium) such as a HDD or a flash memory of the automated driving control device 100, may be stored in a detachable storage medium such as a DVD or a CD-ROM, or may be installed in the HDD or the flash memory of the automated driving control device 100 by mounting a storage medium (non-transitory storage medium) on a drive device. The automated driving control device 100 is an example of a "vehicle control device", and a combination of an action plan generator 140 and the second controller 160 is an example of a "driving controller".

FIG. 2 is a functional configuration diagram illustrating the first controller 120 and the second controller 160. The first controller 120 includes, for example, the recognizer 130, the action plan generator 140, and a mode determiner 150. For example, the first controller 120 realizes a function based on Artificial Intelligence (AI) and a function based on a model given in advance in parallel. For example, a function of "recognizing an intersection" may be executed such that the recognition of the intersection through deep learning or the like, and recognition based on a predetermined condition (there is a signal capable of performing pattern matching, a road sign, or the like) are performed in parallel, and may be realized by scoring both the recognitions and comprehensively evaluating them. Thereby, the reliability of automated driving is guaranteed.

The recognizer 130 recognizes states such as the position and speed of an object around the host vehicle M, and an acceleration on the basis of information which is input from the camera 10, the radar device 12, and the LIDAR 14 through the object recognition device 16. The position of the object is recognized as, for example, a position on absolute coordinates with a representative point of the host vehicle M (the center of gravity, the center of a drive axis, or the like) as a starting point and is used for control. The position of the object may be represented by a representative point such as the center of gravity of the object or a corner or may be represented by a region. The "state" of the object may include the acceleration or jerk of the object, or an "action state" (for example, whether the object is changing a lane or is attempting to change a lane).

In addition, the recognizer 130 recognizes, for example, a lane (traveling lane) in which the host vehicle M is traveling. For example, the recognizer 130 recognizes a traveling lane by comparing a pattern (for example, arrangement of solid lines and dashed lines) of a road division line which is obtained from the second map information 62 with a pattern of a road division line in the vicinity of the host vehicle M which is recognized from an image captured by the camera 10. Meanwhile, the recognizer 130 may recognize a traveling lane by recognizing not only the road division line but also a traveling road boundary (road boundary) including the road division line, a road shoulder, a curbstone, a median strip, a guardrail, and the like. In this recognition, the position of the host vehicle M and processing results of an INS which are acquired from the navigation device 50 may be added. In addition, the recognizer 130 recognizes stop lines, obstacles, red lights, tollhouses, and other road events.

The recognizer 130 recognizes the position and posture of the host vehicle M with respect to a traveling lane at the time of recognizing the traveling lane. The recognizer 130 may recognize, for example, a deviation of a reference point of the host vehicle M from the center of a lane, and an angle formed with respect to a line connecting the center of the lane in a traveling direction of the host vehicle M as a relative position and posture of the host vehicle M with respect to the traveling lane. Instead of this, the recognizer 130 may recognize the position of the reference point of the host vehicle M with respect to any side end portion (a road division line or a road boundary) of the traveling lane, or the like as a relative position of the host vehicle M with respect to the traveling lane. The recognizer 130 further includes a determiner 132, but details of the determiner 132 will be described later.

The action plan generator 140 generates a target trajectory on which the host vehicle M will automatically travel in the future (without depending on a driver's operation) so that the host vehicle M can travel a recommended lane determined by the recommended lane determiner 61 in principle and can cope with the surrounding circumstances of the host vehicle M. The target trajectory includes, for example, a speed factor. For example, the target trajectory is represented as the arrangement of points (trajectory points) at which the host vehicle M is to arrive in order. The trajectory point is a point at which the host vehicle M is to arrive for each predetermined mileage (for example, approximately several meters [m]) along the road, and apart from this, a target speed and a target acceleration for each predetermined sampling time (for example, approximately every several fractions of a [sec]) are generated as a portion of the target trajectory. In addition, the trajectory point may be a point at which the host vehicle M is to arrive at the sampling time for each predetermined sampling time period. In this case, information on the target speed and the target acceleration is represented at intervals of the trajectory points.

The action plan generator 140 may set an automated driving event when generating a target trajectory. The automated driving event includes a constant speed traveling event, a low speed following traveling event, a lane change event, a branching event, a joining event, a takeover event, and the like. The action plan generator 140 generates a target trajectory corresponding to a started-up event.

The mode determiner 150 determines a driving mode of the host vehicle M to be any one of a plurality of driving modes in which tasks imposed on a driver are different. The mode determiner 150 includes, for example, a driver state determiner 152 and a mode change processor 154. These individual functions will be described later.

FIG. 3 is a diagram illustrating an example of a correspondence relationship between a driving mode, a control state of the host vehicle M, and a task. The driving mode of the host vehicle M includes, for example, five modes from a mode A to a mode E. Regarding the control state, that is, the degree of automation of driving control of the host vehicle M, the mode A is the highest, the degree of automation of driving control decreases in the order of the mode B, mode C, and mode D, and the mode E is the lowest. In contrast, regarding the tasks imposed on the driver, the mode A is the lightest, the heaviness increases in the order of the mode B, the mode C, and the mode D, and the mode E is the heaviest. Meanwhile, a control state in the modes D and E is not set automated driving, and thus the automated driving control device 100 is responsible for ending control related to automated driving and transitioning to driving support or manual driving. Hereinafter, the content of each of the driving modes will be illustrated.

In the mode A, an automated driving state is set, and neither forward monitoring nor gripping of the steering wheel 82 (steering grip in the drawing) is imposed on the driver. However, even in the mode A, the driver is required to be in a position to rapidly transition to manual driving in response to a request from the system centered on the automated driving control device 100. Meanwhile, the term "automated driving" as mentioned herein means that both steering and acceleration/deceleration are controlled without depending on the driver's operation. The term "forward" means a space in a traveling direction of the host vehicle M which is visually recognized through a front windshield. The mode A is a driving mode which can be executed in a case where a condition that the host vehicle M is traveling at a speed equal to or less than an upper limit speed (for example, approximately 50 [km/h]) in motorways such as highways and a preceding vehicle to be followed is present is satisfied, and the mode A may also be referred to as Traffic Jam Pilot (TJP). In a case where the condition is not satisfied, the mode determiner 150 changes the driving mode of the host vehicle M to the mode B.

In the mode B, a driving support state is set, and a task of monitoring the front of the host vehicle M (hereinafter, forward monitoring) is imposed on the driver, but a task of gripping the steering wheel 82 is not imposed. The mode B is executed particularly in a case where the host vehicle M is traveling at a speed equal to or more than the upper limit speed at which the above-mentioned TJP is executed. In the mode C, a driving support state is set, a forward monitoring task and a take of gripping the steering wheel 82 are imposed on the driver. The mode D is a driving mode in which a certain degree of driving operation of the driver is required for at least one of steering and acceleration/deceleration of the host vehicle M. For example, in the mode D, driving support such as Adaptive Cruise Control (ACC) and Lane Keeping Assist System (LKAS) is performed. In the mode E, a manual driving state in which both steering and acceleration/deceleration require a driver's driving operation is set. In both the mode D and the mode E, a task of monitoring the front of the host vehicle M is imposed on the driver as a matter of course.

The automated driving control device 100 (and a driving support device (not illustrated)) executes automatic lane change corresponding to a driving mode. The automatic lane change includes automatic lane change (1) based on a request of the system and automatic lane change (2) based on a driver's request. The automatic lane change (1) includes automatic lane change for overtaking which is performed when the speed of a preceding vehicle is lower than a standard compared to the speed of the host vehicle, and automatic lane change for proceeding toward a destination (automatic lane change due to the change of a recommended lane). In the automatic lane change (2), the host vehicle M changes a lane toward an operation direction in a case where a direction indicator is operated by the driver when conditions related to a speed, a positional relationship with the surrounding vehicles, and the like are satisfied.

The automated driving control device 100 does not execute either the automatic lane change (1) or the automatic lane change (2) in the mode A. The automated driving control device 100 executes both the automatic lane change (1) and the automatic lane change (2) in the modes B and C. The driving support device (not illustrated) does not execute the automatic lane change (1) but executes the automatic lane change (2) in the mode D. In the mode E, neither the automatic lane change (1) nor the automatic lane change (2) is executed.

The mode determiner 150 changes the driving mode of the host vehicle M to a driving mode of a heavier task in a case where a task related to the determined driving mode (hereinafter, the present driving mode) is not executed by the driver.

For example, in a case where the driver is in a position where the driver cannot transition to manual driving in response to a request received from the system in the mode A (for example, a case where the driver is continuously look out of a permissible area, or a case where a sign of a difficulty in driving has been detected), the mode determiner 150 performs control of prompting the driver to transition to manual driving by using the HMI 30, moving the host vehicle M to a road shoulder and slowly stopping the host vehicle M when the driver does not respond, and stopping automated driving. After the automated driving is stopped, the host vehicle is set to be in the mode D or E, and the host vehicle M can be started by the driver's manual operation. Hereinafter, the same applies to "stopping of automated driving". In a case where the driver does not monitor the front in the mode B, the mode determiner 150 performs control of prompting the driver to perform forward monitoring by using the HMI 30, moving the host vehicle M to a road shoulder and slowly stopping the host vehicle M when the driver does not respond, and stopping automated driving. In a case where the driver does not monitor the front in the mode C or in a case where the driver is not gripping the steering wheel 82, the mode determiner 150 performs control of prompting the driver to perform forward monitoring and/or grip the steering wheel 82 by using the HMI 30, moving the host vehicle M to a road shoulder and slowly stopping the host vehicle M when the driver does not respond, and stopping automated driving.

The driver state determiner 152 monitors the state of the driver in order to perform the above-described mode change and determines whether or not the state of the driver is a state corresponding to a task. For example, the driver state determiner 152 analyzes an image captured by the driver monitor camera 70 to perform posture estimation processing, and determines whether or not the driver is in a position where the driver cannot transition to manual driving in response to a request received from the system. In addition, the driver state determiner 152 analyzes an image captured by the driver monitor camera 70 to perform line-of-sight estimation processing, and determines whether or not the driver is monitoring the front.

The mode change processor 154 performs various processing for mode change. For example, the mode change processor 154 instructs the action plan generator 140 to generate a target trajectory for stopping at a road shoulder, gives an operation instruction to the driving support device (not illustrated), and controls the HMI 30 in order to prompt the driver to perform an action.

The second controller 160 controls the traveling driving force output device 200, the brake device 210, and the steering device 220 so that the host vehicle M passes through a target trajectory generated by the action plan generator 140 at scheduled time.

Referring back to FIG. 2, the second controller 160 includes, for example, an acquirer 162, a speed controller 164, and a steering controller 166. The acquirer 162 acquires information on a target trajectory (trajectory point) generated by the action plan generator 140 and stores the acquired information in a memory (not illustrated). The speed controller 164 controls the traveling driving force output device 200 or the brake device 210 on the basis of a speed factor associated with the target trajectory stored in the memory. The steering controller 166 controls the steering device 220 in accordance with the degree of curvature of the target trajectory stored in the memory. The processing of the speed controller 164 and the processing of the steering controller 166 are realized by, for example, a combination of feedforward control and feedback control. As an example, the steering controller 166 executes the processing by a combination of feedforward control based on the curvature of a road in front of the host vehicle M and feedback control based on a deviation from the target trajectory.

The traveling driving force output device 200 outputs a traveling driving force (torque) for a vehicle to travel to a driving wheel. The traveling driving force output device 200 includes a combination of, for example, an internal combustion engine, a motor, a transmission, and the like, and an Electronic Controller (ECU) that controls them. The ECU controls the above-described configuration in accordance with information input from the second controller 160 or information input from the driving operator 80.

The brake device 210 includes, for example, a brake caliper, a cylinder that transmits hydraulic pressure to the brake caliper, an electric motor that generates hydraulic pressure in the cylinder, and a brake ECU. The brake ECU controls the electric motor in accordance with information input from the second controller 160 or information input from the driving operator 80, and outputs a brake torque due to a braking operation to each wheel. The brake device 210 may include a mechanism that transmits hydraulic pressure, which is generated by an operation of a brake pedal included in the driving operator 80 to the cylinder through a master cylinder, as a backup. Meanwhile, the brake device 210 is not limited to the above-described configuration, and may be an electronically controlled hydraulic brake device that controls an actuator in accordance with information input from the second controller 160 to transmit the hydraulic pressure of the master cylinder to the cylinder.

The steering device 220 includes, for example, a steering ECU and an electric motor.

For example, the electric motor exerts a force on a rack and pinion mechanism to change the direction of the steering wheel. The steering ECU drives the electric motor in accordance with information input from the second controller 160 or information input from the driving operator 80 to change the direction of the steering wheel.

[Operations]

Figure 4:
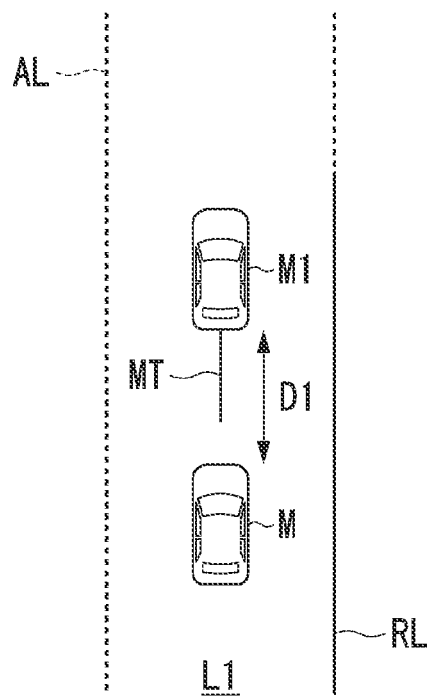
FIG. 4 is a diagram illustrating an example of a scene in which an operation of the vehicle control device according to the embodiment is executed.

Next, operations of the vehicle control device according to the embodiment will be described. In the following description, it is assumed that a driving mode of the host vehicle M is the mode B. FIG. 4 is a diagram illustrating an example of a scene in which an operation of the vehicle control device according to the embodiment is executed. In FIG. 4, the host vehicle M is traveling in a lane L1, and a preceding vehicle M1 is traveling in front of the host vehicle M. While the host vehicle M is traveling in the lane L1, the recognizer 130 recognizes the surrounding circumstances of the host vehicle M, and particularly attempts to recognize road division lines on both sides of the host vehicle M. AL denotes an actual road division line of the lane L1, MT denotes a traveling trajectory of the preceding vehicle M1 of the host vehicle M, and RL denotes a road division line recognized by the camera 10.

The determiner 132 determines whether or not the second map information 62 includes an error on the basis of the surrounding circumstances recognized by the recognizer 130 and the second map information 62. For example, in a case where the surrounding circumstances recognized by the recognizer 130 indicate a lane, while the position of the host vehicle M which is indicated by the second map information 62 indicates a non-lane, and a deviation occurs, the determiner 132 determines that the second map information 62 includes an error.

Further, the determiner 132 determines whether or not a road division line is included in the surrounding circumstances recognized by the recognizer 130. More specifically, the determiner 132 compares the second map information 62 and the recognized surrounding circumstances with each other. In a case where the second map information 62 and the surrounding circumstances do not match each other, the determiner 132 determines whether or not the recognizer 130 can recognize road division lines on both sides of the host vehicle M and determines whether a road division line is included in the recognized surrounding circumstances on the basis of the degree of parallelism between the road division lines on both sides (that is, whether or not an angle formed by extension lines of the road division lines on both sides is equal to or less than a threshold value). Further, in a case where the determiner 132 determines that a road division line is not included in the recognized surrounding circumstances, the determiner 132 determines whether the road division lines on both sides of the host vehicle M are not included, or whether the road division line on only one side of the host vehicle M is not included. In the case of FIG. 4, the determiner 132 determines that a road division line is not included in the surrounding circumstances recognized by the recognizer 130, and determines that the road division line on only one side of the host vehicle M is not included (hereinafter, "a road division line is not included in the surrounding circumstances recognized by the recognizer 130" may be referred to as "missing"). In other words, "a road division line is not included" means that the camera 10 cannot acquire information on a road division line.

In a case where road division line information and the surrounding circumstances do not match each other and the recognizer recognizes the preceding vehicle M1 within the first predetermined distance D1 on a side in the traveling direction of the host vehicle M, the determiner 132 may further determine whether or not the surrounding circumstances recognized by the recognizer 130 include a road division line on the basis of a traveling trajectory MT of the preceding vehicle M1. More specifically, for example, in a case where the surrounding circumstances recognized by the recognizer 130 do not include a line parallel to the traveling trajectory MT of the preceding vehicle M1, the determiner 132 may determine that a road division line is not included in the surrounding circumstances. In the case of FIG. 4, a road division line RL parallel to the traveling trajectory MT of the preceding vehicle M1 is present on the right side of the host vehicle M, but a road division line parallel to the traveling trajectory MT of the preceding vehicle M1 is not present on the left side of the host vehicle M. For this reason, the determiner 132 can determine that a road division line is not included in the surrounding circumstances.

In a case where it is determined that the road division line on only one side of the host vehicle M is not included in the surrounding circumstances recognized by the recognizer 130, the determiner 132 determines whether or not erroneous recognition has occurred in the road division line RL on the other side of the host vehicle M. More specifically, the determiner 132 determines whether or not erroneous recognition has occurred in the road division line RL on the basis of, for example, the degree of parallelism between the road division line RL on the other side and the traveling trajectory MT of the preceding vehicle M1. Further, in a case where it is determined that erroneous recognition has occurred in the road division line RL on the other side, the determiner 132 determines whether the road division line RL on the other side has deviated to the outside or has deviated to the inside on the basis of a traveling direction of the host vehicle M. The determiner 132 can determine whether the road division line RL on the other side has deviated to the outside or has deviated to the inside on the basis of, for example, an angle formed by the road division line RL on the other side and the traveling trajectory MT of the preceding vehicle M1.

Figure 5:
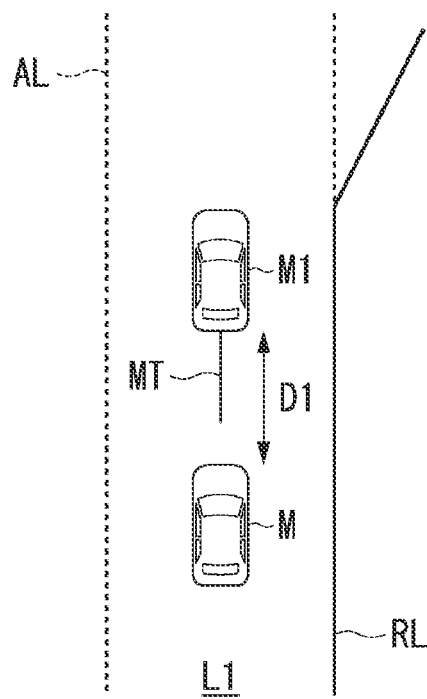
FIG. 5 is a diagram illustrating an example of a scene in which a determiner determines erroneous recognition of a road division line.

FIG. 5 is a diagram illustrating an example of a scene in which the determiner 132 determines erroneous recognition of the road division line RL. In FIG. 5, the determiner 132 determines that the road division line on only the left side of the host vehicle M is not included in the surrounding circumstances recognized by the recognizer 130, and then determines whether or not erroneous recognition has occurred in the road division line RL on the other side of the host vehicle M, that is, the road division line RL on the right side of the host vehicle M. The determiner 132 can determine that erroneous recognition has occurred in the road division line RL on the right side by comparing the traveling trajectory MT of the preceding vehicle M1 with the road division line RL on the right side, and can determine that the road division line RL on the right side is erroneously extending to the outside.

Further, in a case where the determiner 132 determines that the road division line on only one side of the host vehicle M is not included in the surrounding circumstances recognized by the recognizer 130, and the recognizer 130 has recognized the preceding vehicle M1 within the first predetermined distance D1 on a side in the traveling direction of the host vehicle M, the determiner 132 determines whether or not the road division line RL on the other side of the host vehicle M extends from the position of the host vehicle M to the side in front of the preceding vehicle M1. For example, in the case of FIG. 5, the road division line RL on the right side of the host vehicle M extends beyond a front end of the preceding vehicle M1. For this reason, the determiner 132 determines that the road division line RL on the right side of the host vehicle M extends from the position of the host vehicle M to the side in front of the preceding vehicle M1. On the other hand, in a case where the road division line RL on the right side of the host vehicle M does not reach the front end of the preceding vehicle M1, the determiner 132 determines that the road division line RL on the right side of the host vehicle M does not extend from the position of the host vehicle M to the side in front of the preceding vehicle M1.

[Setting of Traveling Continuation Distance]

In a case where the determiner 132 determines that the second map information 62 includes an error during the traveling of the host vehicle M in a driving mode of the mode B and determines that a road division line is not included in the surrounding circumstances, the action plan generator 140 determines a traveling continuation distance in the driving mode of the mode B of the host vehicle M on the basis of the above-described recognition result of the recognizer 130 and the determination result of the determiner 132 and generates a target trajectory corresponding to the traveling continuation distance. Here, particularly, in a case where the recognizer 130 has recognized the preceding vehicle M1 within the first predetermined distance D1 on a side in the traveling direction of the host vehicle M, the action plan generator 140 sets a longer traveling continuation distance in the driving mode of the mode B, compared to a case where the recognizer 130 has not recognized the preceding vehicle M1. Hereinafter, a method of setting a traveling continuation distance in the driving mode of the mode B will be described with reference to FIG. 6.

FIG. 6 is a diagram illustrating a method in which the action plan generator 140 sets a traveling continuation distance in the driving mode of the mode B in a case where the recognizer 130 has recognized the preceding vehicle M1.

As illustrated in FIG. 6, in a case where the recognizer 130 has recognized the preceding vehicle M1, a method of setting a traveling continuation distance is classified into five patterns in accordance with determination results of the determiner 132.

[Pattern (a)]

In a pattern (a) in FIG. 6, in a case where the determiner 132 determines that the second map information 62 includes an error and determines that the road division lines RL on both sides are included in the surrounding circumstances, and the recognizer 130 has recognized the preceding vehicle M1 within the first predetermined distance D1 on a side in the traveling direction of the host vehicle M, the action plan generator 140 sets a traveling continuation distance in the driving mode of the mode B to be a first continuation distance. The first continuation distance is a maximum value in which a traveling continuation distance is set, and is, for example, several hundred meters to several kilometers. This is because the action plan generator 140 can generate a target trajectory on the basis of both the traveling trajectory MT of the preceding vehicle M1 and the road division lines RL on both sides, and redundancy is guaranteed. Meanwhile, as illustrated in the pattern (a) in FIG. 6, at least one of the road division lines RL recognized by the recognizer 130 (In FIG. 6, the road division line on the right side of the host vehicle M) has a short distance and may extend only to the side in front of the preceding vehicle M1. However, even in this case, the action plan generator 140 can generate a target trajectory on the basis of the traveling trajectory MT of the preceding vehicle M1, and thus the action plan generator 140 sets a traveling continuation distance in the driving mode of the mode B to be a first continuation distance.

[Pattern (b)]

In a pattern (b) in FIG. 6, in a case where the determiner 132 determines that the second map information 62 includes an error and determines that the road division line on only one side of the host vehicle M is not included in the surrounding circumstances, and the determiner 132 determines that erroneous recognition has not occurred in the road division line RL on the other side and the recognizer 130 has recognized the preceding vehicle M1 within the first predetermined distance D1 on a side in the traveling direction of the host vehicle M, the action plan generator 140 sets a traveling continuation distance in the driving mode of the mode B to be a second continuation distance. The second continuation distance is a value smaller than the first continuation distance and is, for example, several hundred meters. When compared with the pattern (a) in FIG. 6, the action plan generator 140 can use the traveling trajectory MT of the preceding vehicle M1 when generating a target trajectory, but the road division line on only one side can be used, and thus a traveling continuation distance in the driving mode of the mode B is set to be a smaller value. Meanwhile, as illustrated in the pattern (b) in FIG. 6, the road division line RL on the other side which has not been lost (in FIG. 6, the road division line on the left side of the host vehicle M) has a short distance and may extend only to the side in front of the preceding vehicle M1. However, even in this case, the action plan generator 140 can generate a target trajectory on the basis of the traveling trajectory MT of the preceding vehicle M1, and thus the action plan generator 140 sets a traveling continuation distance in the driving mode of the mode B to be a second continuation distance.

[Pattern (c)]

In a pattern (c) in FIG. 6, in a case where the determiner 132 determines that the second map information 62 includes an error and determines that the road division line on only one side of the host vehicle M is not included in the surrounding circumstances, the determiner 132 determines that erroneous recognition has occurred in the road division line RL on the other side, the determiner 132 determines that the road division line RL on the other side extends from the position of the host vehicle M to the side in front of the preceding vehicle M1, and the recognizer 130 has recognized the preceding vehicle M1 within the first predetermined distance D1 on a side in the traveling direction of the host vehicle M, the action plan generator 140 sets a traveling continuation distance in the driving mode of the mode B to be a second continuation distance. Here, the action plan generator 140 sets the traveling continuation distance in the driving mode of the mode B to be the second continuation distance regardless of whether the road division line RL on the other side erroneously extends to the outside or the inside. This is because the action plan generator 140 can use the traveling trajectory MT of the preceding vehicle M1 and the road division line RL having a sufficient length when generating a target trajectory in any case, and a certain degree of redundancy can be guaranteed.

[Pattern (d)]

In a pattern (d) in FIG. 6, in a case where the determiner 132 determines that the second map information 62 includes an error and determines that the road division line on only one side of the host vehicle M is not included in the surrounding circumstances, the determiner 132 determines that erroneous recognition has occurred in the road division line RL on the other side, the determiner 132 determines that the road division line RL on the other side does not extend from the position of the host vehicle M to the side in front of the preceding vehicle M1, and recognizer 130 has recognized the preceding vehicle M1 within the first predetermined distance D1 on a side in the traveling direction of the host vehicle M, the mode determiner 150 terminates the driving mode of the mode B. Specifically, for example, the mode determiner 150 changes the driving mode of the mode B to the mode C or a driving mode in which a heavier task is imposed. This is because, in the pattern (c) in FIG. 6, the action plan generator 140 can generate a target trajectory using the traveling trajectory MT of the preceding vehicle M1 and the road division line RL having a sufficient length, but in the pattern (d) in FIG. 6, the action plan generator 140 has to depend on the traveling trajectory MT of the preceding vehicle M1 when generating a target trajectory, and redundancy is not guaranteed.

[Pattern (e)]

In a pattern (e) in FIG. 6, in a case where the determiner 132 determines that the second map information 62 includes an error and determines that the road division lines RL on both sides of the host vehicle M are not included in the surrounding circumstances, and the recognizer 130 has recognized the preceding vehicle M1 within the first predetermined distance D1 on a side in the traveling direction of the host vehicle M, the mode determiner 150 terminates the driving mode of the mode B. Specifically, for example, the mode determiner 150 changes the driving mode of the mode B to the mode C or a driving mode in which a heavier task is imposed. This is because, similarly to the pattern (d) in FIG. 6, the action plan generator 140 has to depend on the traveling trajectory MT of the preceding vehicle M1 when generating a target trajectory, and redundancy is not guaranteed.

Meanwhile, in any of the above-described patterns, the action plan generator 140 generates a target trajectory such that the host vehicle M follows the preceding vehicle M1, and the second controller 160 causes the host vehicle M to travel along the generated target trajectory. Here, in a case where the determiner 132 determines that the road division line on only one side of the host vehicle M has been lost, the action plan generator 140 generates a target trajectory such that the host vehicle M follows the preceding vehicle M1 on the basis of the other road division line RL that has not been lost.

More specifically, the action plan generator 140 generates a target trajectory such that the host vehicle M follows the preceding vehicle M1 along the other road division line RL that has not been lost.

FIG. 7 is a diagram illustrating a method in which the action plan generator 140 sets a traveling continuation distance in the driving mode of the mode B in a case where the recognizer 130 has not recognized the preceding vehicle M1. As illustrated in FIG. 7, in a case where the recognizer 130 has not recognized the preceding vehicle M1, a method of setting a traveling continuation distance is classified into two patterns in accordance with determination results of the determiner 132.

In a pattern (f) in FIG. 7, in a case where the determiner 132 determines that the second map information 62 includes an error and determines that the road division lines RL on both sides are included in the surrounding circumstances, and the recognizer 130 has not recognized the preceding vehicle M1 within the first predetermined distance D1 on a side in the traveling direction of the host vehicle M, the action plan generator 140 sets a traveling continuation distance in the driving mode of the mode B to be a third continuation distance. The third continuation distance is a value smaller than the first continuation distance and the second continuation distance and is, for example, several tens meters to several hundred meters. In a case where the road division line has not been lost, the driving mode is changed after causing the host vehicle M to continuously travel in the driving mode of the mode B at a fixed distance, and thus it is possible to reduce discomfort felt by an occupant of the host vehicle M due to a sudden change in the driving mode.

In a pattern (g) in FIG. 7, in a case where the determiner 132 determines that the second map information 62 includes an error and determines that a road division line is not included in the surrounding circumstances, and the recognizer 130 has not recognized the preceding vehicle M1 within the first predetermined distance D1 on a side in the traveling direction of the host vehicle M, the mode determiner 150 terminates the driving mode of the mode B. Specifically, for example, the mode determiner 150 changes the driving mode of the mode B to the mode C or a driving mode in which a heavier task is imposed. Here, more specifically, in a case where it is determined that at least a road division line on one side is not included in the surrounding circumstances, the mode determiner 150 changes the driving mode of the mode B.

[Flow of Operations]

Figure 8:
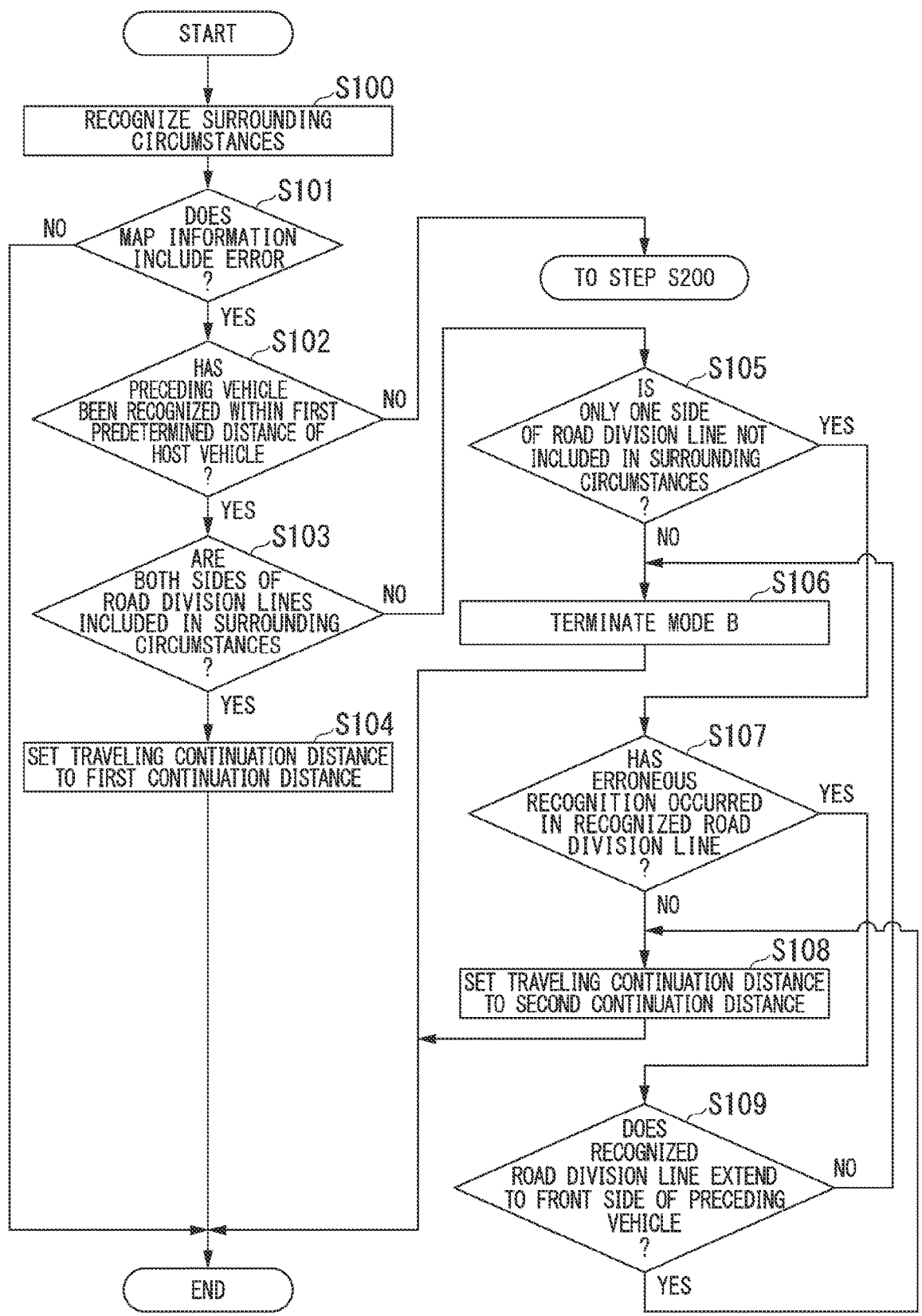
FIG. 8 is a flowchart illustrating an example of a flow of operations executed by the vehicle control device according to the present embodiment.
Figure 9:
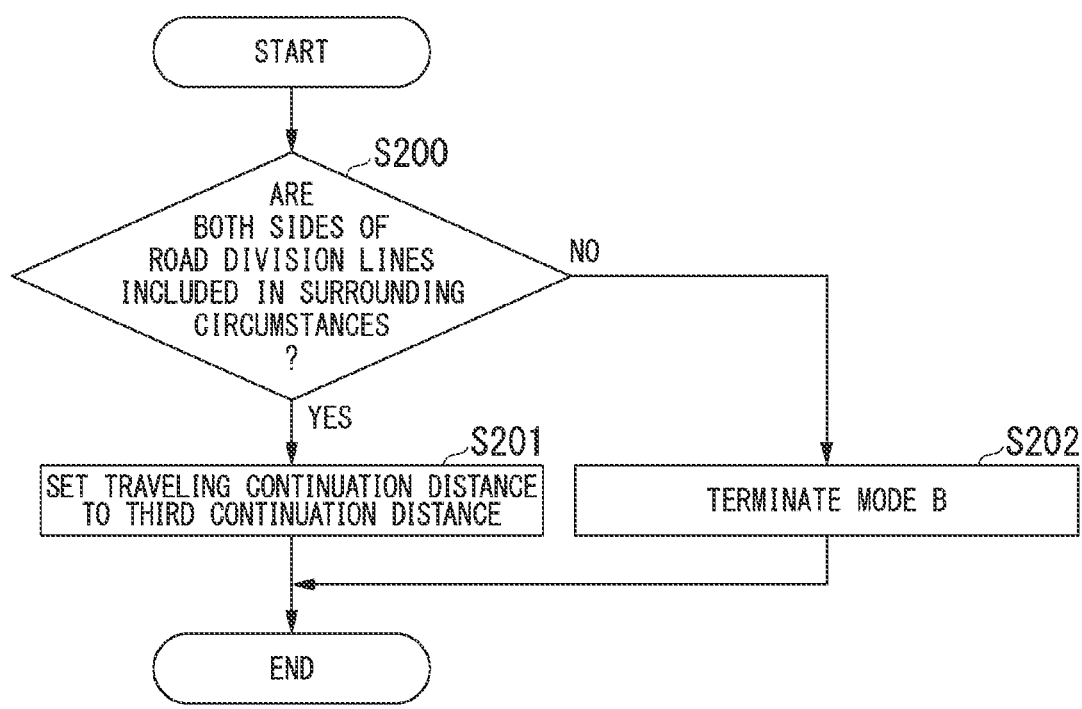
FIG. 9 is a flowchart illustrating an example of a flow of operations executed by the vehicle control device in a case where the recognizer does not recognize a preceding vehicle within a first predetermined distance D1.

Next, a flow of operations executed by the vehicle control device according to the present embodiment will be described with reference to FIGS. 8 and 9. FIG. 8 is a flowchart illustrating an example of a flow of operations executed by the vehicle control device according to the present embodiment. Processing of this flowchart is executed at a predetermined control cycle while the host vehicle M is traveling in the driving mode of the mode B.

First, the recognizer 130 recognizes the surrounding circumstances of the host vehicle M (step S100). Next, the determiner 132 determines whether or not the second map information 62 includes an error on the basis of the surrounding circumstances recognized by the recognizer 130 (step S101). In a case where it is determined that the second map information 62 does not include an error, the vehicle control device terminates the processing of this flowchart. On the other hand, in a case where it is determined that the second map information 62 includes an error, the determiner 132 then determines whether or not the recognizer 130 has recognized the preceding vehicle M1 within the first predetermined distance D1 on a side in the traveling direction of the host vehicle M (step S102). In a case where it is determined that the recognizer 130 has not recognized the preceding vehicle M1 within the first predetermined distance D1 on a side in the traveling direction of the host vehicle M, the determiner 132 causes the processing to proceed to step S200 to be described later.

In a case where it is determined that the recognizer 130 has recognized the preceding vehicle M1 within the first predetermined distance D1 on a side in the traveling direction of the host vehicle M, the determiner 132 then determines whether or not the road division lines on both sides of the host vehicle M are included in the surrounding circumstances recognized by the recognizer 130 (step S103). In a case where it is determined that the road division lines RL on both sides of the host vehicle M are included in the surrounding circumstances recognized by the recognizer 130, the action plan generator 140 sets a traveling continuation distance in the driving mode of the mode B to be a first continuation distance (step S104).

In a case where it is not determined that road division lines RL on both sides of the host vehicle M are included in the surrounding circumstances recognized by the recognizer 130, the determiner 132 then determines whether or not the road division line on only one side is not included in the surrounding circumstances (step S105). In a case where it is determined that the road division line on only one side is not included in the surrounding circumstances, that is, the road division lines on both sides are not included in the surrounding circumstances, the mode determiner 150 terminates the driving mode of the mode B (step S106).

In a case where it is determined that the road division line on only one side has been lost, the determiner 132 determines whether or not erroneous recognition has occurred in the road division line RL that has been recognized without being lost (step S107). In a case where it is determined that erroneous recognition has not occurred in the recognized road division line RL, the action plan generator 140 sets a traveling continuation distance in the driving mode of the mode B to be a second continuation distance (step S108).

In a case where it is determined that erroneous recognition has occurred in the recognized road division line RL, the determiner 132 then determines whether or not the recognized road division line RL extends from the position of the host vehicle M to the side in front of the preceding vehicle M1 (step S109). In a case where it is determined that the recognized road division line RL extends from the position of the host vehicle M to the side in front of the preceding vehicle M1, the action plan generator 140 sets a traveling continuation distance in the driving mode of the mode B to be a second continuation distance. In a case where it is determined that the recognized road division line RL does not extend from the position of the host vehicle M to the side in front of the preceding vehicle M1, the mode determiner 150 terminates the driving mode of the mode B. Thereby, the processing of this flowchart is terminated.

Next, a flow of operations executed by the vehicle control device in a case where the recognizer 130 has not recognized the preceding vehicle M1 within the first predetermined distance D1 will be described with reference to FIG. 9. FIG. 9 is a flowchart illustrating an example of a flow of operations executed by the vehicle control device in a case where the recognizer 130 has not recognized the preceding vehicle M1 within the first predetermined distance D1. The processing of this flowchart is executed in a case where the determination result in step S102 of FIG. 8 is No.

The determiner 132 determines whether or not the road division lines on both sides of the host vehicle M are included in the surrounding circumstances recognized by the recognizer 130 (step S200). In a case where it is determined whether or not the road division lines on both sides of the host vehicle M are included in the surrounding circumstances recognized by the recognizer 130, the action plan generator 140 sets a traveling continuation distance in the driving mode of the mode B to be a third continuation distance (step S201). On the other hand, in a case where it is not determined that the road division lines on both sides of the host vehicle M are included in the surrounding circumstances recognized by the recognizer 130, the action plan generator 140 terminates the driving mode of the mode B (step S202). Thereby, the processing of this flowchart is terminated.

According to the above-described embodiment of the present invention, the driving controller sets a longer traveling continuation distance in the mode B in a case where the determiner 132 determines that the second map information 62 includes an error during the traveling of the host vehicle M in the mode B and determines that a road division line is not included in the surrounding circumstances, and the recognizer 130 has recognized a preceding vehicle within the first predetermined distance D1 on a side in the traveling direction of the host vehicle M, compared to a case where the preceding vehicle D1 has not been recognized. Thereby, even when map information stored in a vehicle and recognized outside information are different from each other, driving control can be flexibly changed.

The above-described embodiment can be expressed as follows.

A vehicle control device including:
a storage device that stores a program; and
a hardware processor,
wherein the hardware processor executes the program stored in the storage device to:
recognize surrounding circumstances of a vehicle;
control steering and acceleration/deceleration of the vehicle without depending on an operation of a driver of the vehicle based on the surrounding circumstances and map information;
determine any one of a plurality of driving modes including a first driving mode and a second driving mode as a driving mode of the vehicle, and change the driving mode of the vehicle to a driving mode in which the task is heavier when a task associated with the determined driving mode is not executed by the driver, the second driving mode being a driving mode in which a task assigned to the driver is lighter than that of the first driving mode, some of the plurality of driving modes including at least the second driving mode being performed by controlling the steering and the acceleration/deceleration of the vehicle without depending on the operation of the driver of the vehicle;
determine whether or not the map information includes an error and determine whether or not a road division line is included in the surrounding circumstances, based on the surrounding circumstances and the map information; and
set a longer traveling continuation distance in the second driving mode in a case where it is determined during traveling of the vehicle in the second driving mode that the map information includes an error, the road division line is not included in the surrounding circumstances, and a preceding vehicle has been recognized within a first predetermined distance on a traveling direction side of the vehicle, compared to a case where a preceding vehicle has not been recognized.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle control device comprising:
a storage device that stores a program; and
a hardware processor,
wherein the hardware processor executes the program stored in the storage device to:
recognize surrounding circumstances of a vehicle;
control steering and acceleration/deceleration of the vehicle without depending on an operation of a driver of the vehicle based on the surrounding circumstances and map information;
determine any one of a plurality of driving modes including a first driving mode and a second driving mode as a driving mode of the vehicle, and change the driving mode of the vehicle to a driving mode in which the task is heavier when a task associated with the determined driving mode is not executed by the driver, the second driving mode being a driving mode in which a task assigned to the driver is lighter than that of the first driving mode, some of the plurality of driving modes including at least the second driving mode being performed by controlling the steering and the acceleration/deceleration of the vehicle without depending on the operation of the driver of the vehicle;
determine whether or not the map information includes an error and determine whether or not a road division line is included in the surrounding circumstances, based on the surrounding circumstances and the map information; and
set a longer traveling continuation distance in the second driving mode in a case where it is determined during traveling of the vehicle in the second driving mode that the map information includes an error, the road division line is not included in the surrounding circumstances, and a preceding vehicle has been recognized within a first predetermined distance on a traveling direction side of the vehicle, compared to a case where a preceding vehicle has not been recognized.

2. The vehicle control device according to claim 1,
wherein the hardware processor compares the map information and the surrounding circumstances with each other, and in a case where the map information and the surrounding circumstances do not match each other, it is determined whether or not a road division line is included in the surrounding circumstances based on at least one of whether or not the road division lines on both sides of the vehicle have been recognized, a degree of parallelism between the road division lines on both sides, and a traveling trajectory of the preceding vehicle.

3. The vehicle control device according to claim 1,
wherein the hardware processor determines whether the road division lines on both sides of the vehicle are not included or whether only the road division line on one side of the vehicle is not included, in a case where it is determined that the road division line is not included in the surrounding circumstances.

4. The vehicle control device according to claim 3,
wherein the hardware processor determines whether or not erroneous recognition has occurred in the road division line on the other side of the vehicle in a case where it is determined that only the road division line on one side of the vehicle is not included in the surrounding circumstances, and determines whether the road division line on the other side of the vehicle has deviated to the outside or the inside with the traveling direction of the vehicle as a reference in a case where it is determined that erroneous recognition has occurred in the road division line on the other side of the vehicle.

5. The vehicle control device according to claim 4,
wherein the hardware processor determines whether the road division line on the other side of the vehicle has deviated to the outside or the inside with the traveling direction of the vehicle as a reference based on the degree of parallelism with respect to the traveling trajectory of the preceding vehicle in a case where it is determined that erroneous recognition has occurred in the road division line on the other side of the vehicle, and a preceding vehicle has been recognized within the first predetermined distance on the traveling direction side of the vehicle.

6. The vehicle control device according to claim 4,
wherein the hardware processor sets a traveling continuation distance in the second driving mode to be a second continuation distance in a case where it is determined that the map information includes an error, it is determined that only the road division line on one side of the vehicle is not included in the surrounding circumstances, it is determined that erroneous recognition has not occurred in the road division line on the other side, and a preceding vehicle has been recognized within the first predetermined distance on the traveling direction side of the vehicle.

7. The vehicle control device according to claim 3,
wherein the hardware processor determines whether the road division line on the other side of the vehicle extends from a position of the vehicle to a side in front of the preceding vehicle in a case where it is determined that only the road division line on one side of the vehicle is not included in the surrounding circumstances, and a preceding vehicle has been recognized within the first predetermined distance on the traveling direction side of the vehicle.

8. The vehicle control device according to claim 7,
wherein the hardware processor sets a traveling continuation distance in the second driving mode to be a second continuation distance in a case where it is determined that the map information includes an error, it is determined that only the road division line on one side of the vehicle is not included in the surrounding circumstances, it is determined that erroneous recognition has occurred in the road division line on the other side, it is determined that the road division line on the other side extends from the position of the vehicle to the side in front of the preceding vehicle, and a preceding vehicle has been recognized within the first predetermined distance on the traveling direction side of the vehicle.

9. The vehicle control device according to claim 7,
wherein the hardware processor changes the second driving mode to the first driving mode in a case where it is determined that the map information includes an error, it is determined that only the road division line on one side of the vehicle is not included in the surrounding circumstances, it is determined that erroneous recognition has occurred in the road division line on the other side, it is determined that the road division line on the other side does not extend from the position of the vehicle to the side in front of the preceding vehicle, and a preceding vehicle has been recognized within the first predetermined distance on the traveling direction side of the vehicle.

10. The vehicle control device according to claim 3,
wherein the hardware processor changes the second driving mode to the first driving mode in a case where it is determined that the map information includes an error, it is determined that the road division lines on both sides of the vehicle are not included in the surrounding circumstances, and a preceding vehicle has been recognized within the first predetermined distance on the traveling direction side of the vehicle.

11. The vehicle control device according to claim 1,
wherein the hardware processor sets a traveling continuation distance in the second driving mode to be a first continuation distance in a case where it is determined that the map information includes an error, it is determined that the road division lines on both sides are included in the surrounding circumstances, and a preceding vehicle has been recognized within the first predetermined distance on the traveling direction side of the vehicle.

12. The vehicle control device according to claim 1,
wherein the hardware processor sets a traveling continuation distance in the second driving mode to be a third continuation distance in a case where it is determined that the map information includes an error, it is determined that the road division lines on both sides are included in the surrounding circumstances, and a preceding vehicle has not been recognized within the first predetermined distance on the traveling direction side of the vehicle.

13. The vehicle control device according to claim 1,
wherein the hardware processor changes the second driving mode to the first driving mode in a case where it is determined that the map information includes an error, it is determined that the road division line is not included in the surrounding circumstances, and a preceding vehicle has not been recognized within the first predetermined distance on the traveling direction side of the vehicle.

14. A vehicle control method to be executed by a computer, the vehicle control method comprising:
- recognizing surrounding circumstances of a vehicle;
- controlling steering and acceleration/deceleration of the vehicle without depending on an operation of a driver of the vehicle based on the surrounding circumstances and map information;
- determining any one of a plurality of driving modes including a first driving mode and a second driving mode as a driving mode of the vehicle, and changing the driving mode of the vehicle to a driving mode in which the task is heavier when a task associated with the determined driving mode is not executed by the driver, the second driving mode being a driving mode in which a task assigned to the driver is lighter than that of the first driving mode, some of the plurality of driving modes including at least the second driving mode being performed by controlling the steering and the acceleration/deceleration of the vehicle without depending on the operation of the driver of the vehicle;
- determining whether or not the map information includes an error and determining whether or not erroneous recognition has occurred in a road division line included in the surrounding circumstances, based on the surrounding circumstances and the map information; and
- setting a longer traveling continuation distance in the second driving mode in a case where it is determined during traveling of the vehicle in the second driving mode that the map information includes an error, the road division line is not included in the surrounding circumstances, and a preceding vehicle has been recognized within a first predetermined distance on a traveling direction side of the vehicle, compared to a case where a preceding vehicle has not been recognized.

15. A storage medium storing a program causing a computer to:
- recognize surrounding circumstances of a vehicle;
- determine whether or not a road division line is included in the surrounding circumstances based on the surrounding circumstances and map information;
- control steering and acceleration/deceleration of the vehicle without depending on an operation of a driver of the vehicle based on the surrounding circumstances and map information;
- determine any one of a plurality of driving modes including a first driving mode and a second driving mode as a driving mode of the vehicle, and change the driving mode of the vehicle to a driving mode in which the task is heavier when a task associated with the determined driving mode is not executed by the driver, the second driving mode being a driving mode in which a task assigned to the driver is lighter than that of the first driving mode, some of the plurality of driving modes including at least the second driving mode being performed by controlling the steering and the acceleration/deceleration of the vehicle without depending on the operation of the driver of the vehicle;
- determine whether or not the map information includes an error and determine whether or not erroneous recognition has occurred in a road division line included in the surrounding circumstances, based on the surrounding circumstances and the map information, and
- set a longer traveling continuation distance in the second driving mode in a case where it is determined during traveling of the vehicle in the second driving mode that the map information includes an error, the road division line is not included in the surrounding circumstances, and a preceding vehicle has been recognized within a first predetermined distance on a traveling direction side of the vehicle, compared to a case where a preceding vehicle has not been recognized.

* * * * *